United States Patent
Katayama

[11] Patent Number: 5,479,349
[45] Date of Patent: Dec. 26, 1995

[54] CRUISE CONTROL APPARATUS FOR A VEHICLE USING A CONTROL QUANTITY TO ACTUATE THE THROTTLE AND A CONTROL QUANTITY INTEGRATOR TO ACTUATE THE GEAR CHANGE DETERMINER

[75] Inventor: Kazuyori Katayama, Himeji, Japan

[73] Assignee: Mitsubishi Denki Kabushiki Kaisha, Tokyo, Japan

[21] Appl. No.: 989,367

[22] Filed: Dec. 11, 1992

[30] Foreign Application Priority Data

Dec. 12, 1991 [JP] Japan ................. 3-329096

[51] Int. Cl.$^6$ ............................................. B60K 31/00
[52] U.S. Cl. ........................ 364/426.04; 364/424.1; 364/424.01
[58] Field of Search ............. 364/426.04, 424.1; 180/170, 178, 179

[56] References Cited

U.S. PATENT DOCUMENTS

| | | | |
|---|---|---|---|
| 4,982,805 | 1/1991 | Naitou et al. | 180/170 |
| 5,010,490 | 4/1991 | Naito et al. | 364/426.04 |
| 5,024,284 | 6/1991 | Nakano et al. | 180/170 |
| 5,099,941 | 3/1992 | Kawano et al. | 364/426.04 |
| 5,123,301 | 6/1992 | Hägele et al. | 364/426.04 |
| 5,148,721 | 9/1992 | Anan et al. | 364/426.04 |
| 5,203,423 | 4/1993 | Fujiwara et al. | 180/179 |
| 5,243,523 | 9/1993 | Stepper et al. | 364/426.04 |

OTHER PUBLICATIONS

Manual for New Car Model "GTO" issued Oct., 1990.

*Primary Examiner*—Mark R. Powell
*Assistant Examiner*—Steven P. Sax
*Attorney, Agent, or Firm*—Sughrue, Mion, Zinn, Macpeak & Seas

[57] ABSTRACT

A cruise control apparatus for a vehicle can control an automatic transmission such that gear shifting is carried out in accordance with a running resistance of the vehicle while taking account of the slope of a road and the weight of the vehicle, thereby allowing proper and desired speed control. A speed deviation calculator 24 calculates, based on a speed signal and a target speed signal, a deviation between the target speed and the actual vehicle speed and generates a corresponding speed deviation signal. A control quantity calculator 25 calculates a control quantity Tn for controlling a driving force of the vehicle based on the acceleration signal and the speed deviation signal. A throttle valve actuator 11 drives the throttle valve 29 based on the control quantity Tn. A control quantity integrator 27 integrates the control quantity Tn with respect to time based on an output signal from a gear change determiner 26 to thereby simulate a change in the driving force of the vehicle. The gear change determiner 26 determines, based on the acceleration signal, the speed deviation signal and the integrated control quantity, whether the gear ratio of the automatic transmission 28 is to be changed.

4 Claims, 7 Drawing Sheets

SET CRUISE CONTROL

CRUISE CONTROL APPARATUS FOR A VEHICLE USING A CONTROL QUANTITY TO ACTUATE THE THROTTLE AND A CONTROL QUANTITY INTEGRATOR TO ACTUATE THE GEAR CHANGE DETERMINER

BACKGROUND OF THE INVENTION

The present invention relates to a cruise control apparatus for a vehicle which serves to maintain the speed of the vehicle at a constant value in an automatic fashion.

FIG. 9 shows the general arrangement of a conventional cruise control apparatus for a vehicle as disclosed in Japanese Patent Laid-Open No. 58-39311. In this figure, a set switch 1 is adapted to be manipulated by the driver of the vehicle to start cruise control. A cancellation switch 2 is turned on in response to the application of the brakes by the driver to cancel the cruise control. A speed sensor 3 senses the speed of the vehicle, and comprises a cruciform rotary member 3a which has four magnetic poles equally spaced from each other at an interval of 90 degrees and which is rotated by an unillustrated transmission through an unillustrated metering cable, and a reed switch 3b disposed near the rotary member 3a so that it is open or closed each time one of the four magnetic poles comes in proximity of the reed switch 3b for generating a pulse signal in the form of a series of pulses having a frequency proportional to the speed of the vehicle. A power source in the form of a battery 4 is connected through a power or main switch 5 to a control unit 6 including a computing and processing circuit 6a such as a microcomputer, so that the control unit 6 is powered by the battery 4 when the main switch 5 is turned on. The control unit 6 receives the output signals from the set switch 1, the cancellation switch 2 and the speed sensor 3. Based on these signals, the control unit 6 performs various operational calculations for automatically controlling the speed of the vehicle so as to make it equal to a target speed V, and generates various output signals for automatic cruise control. A throttle actuator 7 in the form of a motor-operated actuator having an unillustrated motor is electrically connected to the control unit 6 so that it receives the output signals from the control unit 6 for driving a throttle valve 9 in a closing or opening direction. The throttle valve 9 is disposed in an intake pipe 8 of the engine and it is connected to an unillustrated accelerator pedal through an unillustrated cable or the like so that it is caused to rotate around a pivot shaft by an accelerator pedal operation of the driver through the cable for controlling the amount or flow rate of intake air supplied to the engine via the intake pipe 8. The throttle actuator 7 is operatively connected to the throttle valve 9 through a link member 7a and a connecting rod 7b, so that the link member 7a is caused to rotate around its pivot axis under the action of the motor in the throttle actuator 7 to drive the throttle valve 9 via the rod 7b. The unillustrated motor of the throttle actuator 7 is operatively coupled with the link member 7a through an unillustrated electromagnetic clutch which is operated by an electromagnetic clutch operating signal from the control unit 6 to control the mechanical connection between the motor and the link member 7a.

The operation of the above-mentioned conventional cruise control apparatus will now be described in detail below. When the main switch 5 is turned on by the driver, the control unit 6 is powered by the battery 4 and processes the output signal from the speed sensor 3. The speed sensor 3 generates a speed signal comprising a series of pulses having a frequency proportional to the speed at which the vehicle is travelling. The control unit 6 measures the periods of successive pulses and calculates the vehicle speed based thereon. In this state, if the driver manipulates the set switch 1, a corresponding signal is sent therefrom to the control unit 6 which then stores the vehicle speed at that time as a target speed, while starting cruise control. Thereafter, the control unit 6 successively compares the actual speed of the vehicle successively detected with the target speed and generates control signals to the throttle actuator 7 which is thereby operated to properly control the opening of the throttle valve 9 in order to make the vehicle travel at the target speed. Specifically, if the actual vehicle speed is lower than the target speed, the control unit 6 generates a throttle-opening signal for opening the throttle valve 9 by a predetermined quantity, whereas if the vehicle speed is higher than the target speed, the control unit 6 generates a throttle-closing signal for closing the throttle valve 9 by a predetermined quantity. As a result, the vehicle can travel at the constant target speed in an automatic fashion without the need of the driver's accelerator pedal operation.

If the driver applies the brakes of the vehicle during such cruise control, the cancellation switch 2 is operated, generating a cruise cancellation signal to the control unit 6. Upon receipt of the cancellation signal, the control unit 6 immediately generates a clutch releasing signal to the throttle actuator 7 which then disengages the unillustrated electromagnetic clutch. Thereafter, the driver can control the vehicle speed at his or her own will by stepping down or up the accelerator pedal to manually adjust the opening of the throttle valve 9.

With the conventional cruise control apparatus as constructed above, the control unit 6 successively makes a comparison between the varying actual speed of the vehicle and the target speed at predetermined time intervals measured by a timer or when a deviation between the actual vehicle speed and the target speed exceeds a predetermined value without regard to the slope of the road, the weight of the vehicle, etc., so that it generates a control output to the throttle actuator 7 for making the actual vehicle speed equal to the target speed, whereby the throttle actuator 7 can properly control the opening of the throttle valve 9. However, this results in the following drawbacks. Namely, when the vehicle is travelling on an uphill slope, the transmission can be forced to frequently perform shift-up and shift-down operations, or when the vehicle is travelling on a downhill slope, the transmission can be controlled to continuously shift down, thus preventing proper or necessary speed control.

SUMMARY OF THE INVENTION

The present invention is intended to overcome the above-mentioned problems encountered with the conventional cruise control apparatus.

An object of the invention is to provide a novel and improved cruise control apparatus for a vehicle which can control a transmission such that gear shifting is carried out in accordance with a running resistance of the vehicle while taking account of the slope of a road, the weight of the vehicle and the like, thereby allowing proper and desired speed control.

In order to achieve the above object, according to the present invention, there is provided a cruise control apparatus for a vehicle comprising: a speed sensor for sensing a speed of the vehicle at which the vehicle is travelling, and for generating a corresponding speed signal; acceleration sensing means for successively sensing an acceleration of the vehicle at predetermined intervals based on the output signal from the speed sensor; a target speed setter for setting a target speed of the vehicle at which the vehicle is to travel; target speed signal generating means for generating a target speed signal representative of the target speed; speed deviation calculating means for calculating, based on the speed signal and the target speed signal, a deviation between the target speed and the actual vehicle speed and for generating a corresponding output signal; control quantity calculating means for calculating a control quantity for controlling a driving force of the vehicle based on the output signals from the acceleration sensing means and the speed deviation calculating means; throttle valve actuating means for driving a throttle valve in an engine of the vehicle based on the output signal from the control quantity calculating means; control quantity integrating means for integrating the control quantity from the control quantity calculating means with respect to time based on an output signal from a gear ratio change determining means to thereby simulate a change in a driving force of the vehicle; and an automatic transmission operable to perform change its gear ratio in response to the output signal from the gear change determining means; wherein the gear change determining means determines, based on the output signals from the acceleration sensing means, the speed deviation calculating means and the control quantity integrating means, whether the gear ratio of the automatic transmission is to be changed.

The gear change determining means generates a downshift signal for down-shifting the automatic transmission when the speed deviation $\epsilon$ is negative and when the absolute value of the speed deviation $\epsilon$ is greater than a first predetermined value $\epsilon a$.

The control quantity integrating means integrates the control quantity Tn to provide a current integrated value In using the following formulae in dependence upon the sign of the control quantity Tn:

when the control quantity Tn is positive, $$In=In-1+K3\times|Tn|,$$

where In–1 is a preceding integrated value, and K3 is a constant;

when the control quantity Tn is negative;

$$In=In-1-K4\times|Tn|,$$

where In–1 is a preceding integrated value, and K4 is a constant; and when the control quantity Tn is equal to zero, $$In=In-1,$$

where In–1 is a preceding integrated value.

The gear change determining means generates an up-shift signal for up-shifting the automatic transmission when the absolute value of the speed deviation $\epsilon$ is less than a second predetermined value $\epsilon b$ and when the absolute value of the acceleration $\alpha$ is less than a predetermined value $\alpha$ and when the integrated value In is less than a predetermined value Ib.

The above and other objects, features and advantages of the invention will be more readily apparent from the following detailed description of a preferred embodiment of the invention taken in conjunction with accompanying drawings.

DETAILED DESCRIPTION OF THE DRAWINGS

A preferred embodiment of the present invention will now be described in detail while referring to the accompanying drawings.

Figure 1:
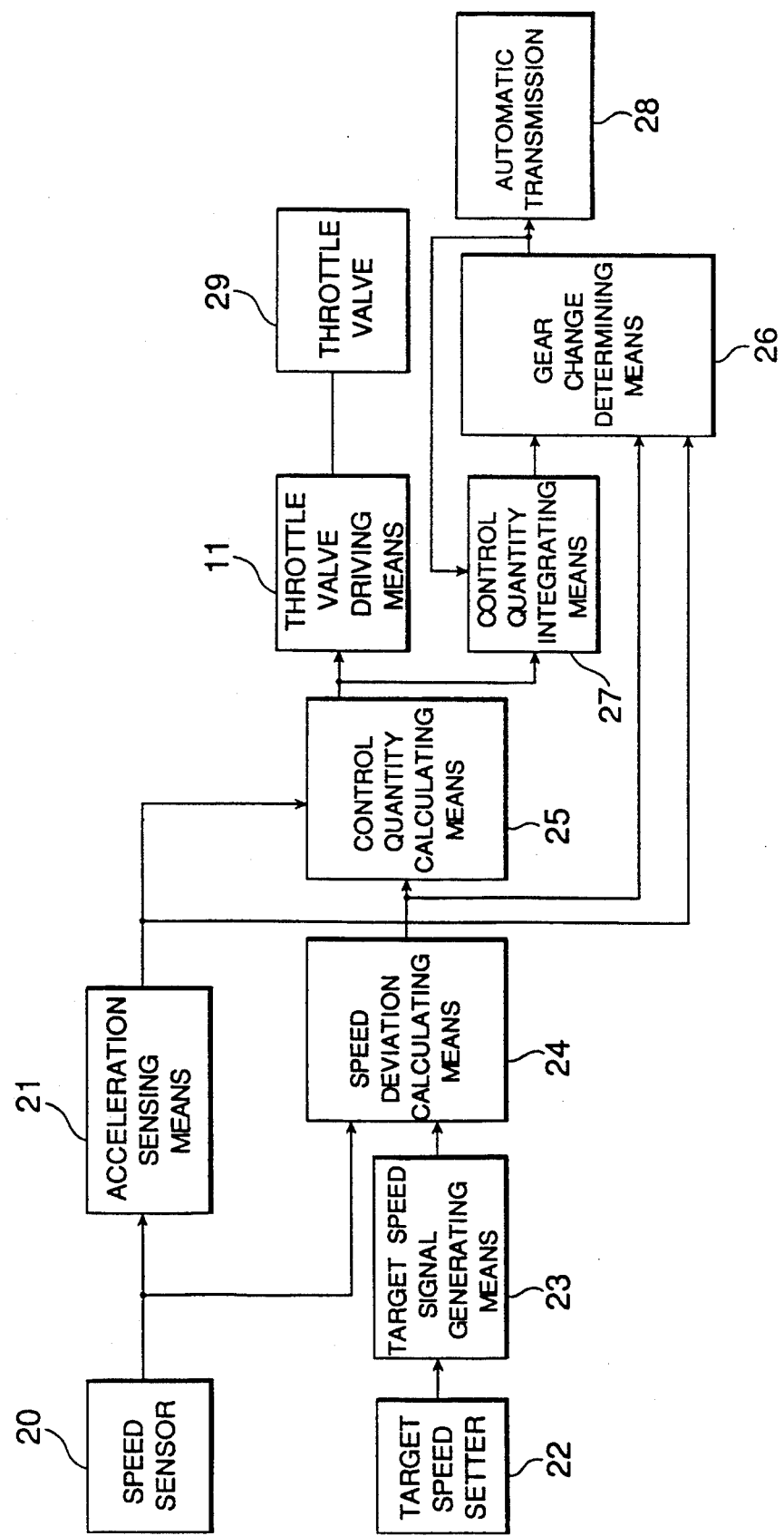
FIG. 1 is a block diagram of a cruise control apparatus according to the present invention.
Figure 2:
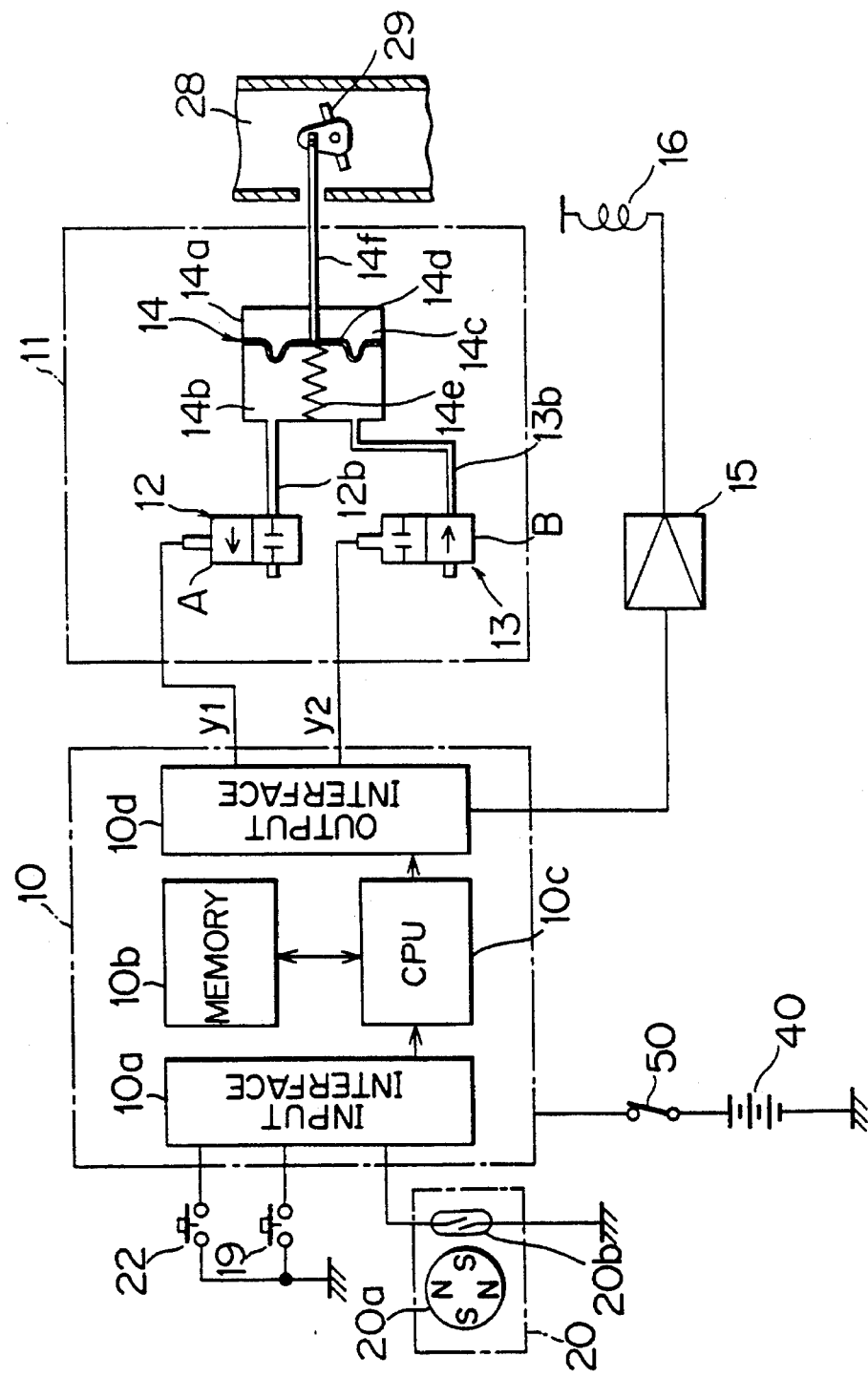
FIG. 2 shows the general construction of the cruise control apparatus of FIG. 1.

Referring to the drawings, FIG. 1 shows in block form the general arrangement of a cruise control apparatus for a vehicle constructed in accordance with the principles of the present invention, and FIG. 2 shows the more detailed construction thereof.

As shown in FIG. 1, the cruise control apparatus of the invention conceptually includes the following elements. Namely, a speed sensor 20 senses an actual speed of the vehicle at which the vehicle is travelling, and generates a corresponding speed signal. An acceleration sensing means 21 successively senses or calculates an acceleration of the vehicle at predetermined intervals based on the output signal from the speed sensor 20 and generates a corresponding acceleration signal. A target speed setter in the form of a set switch 22 is adapted to be operated by the driver to set a target speed of the vehicle and generate a corresponding output signal. A target speed signal generating means 23 is connected to receive the output signal from the target speed setter 22 for generating a target speed signal representative of the target speed. A speed deviation calculating means 24 calculates, based on the speed signal and the target speed signal, a deviation between the target vehicle speed and the actual vehicle speed, and generates a corresponding speed deviation signal. A control quantity calculating means 25 calculates a control quantity for controlling the driving force of the vehicle based on the acceleration signal and the speed deviation signal, and generates a corresponding control quantity signal. A throttle valve actuating means 11 drives a throttle valve 29 of the vehicle engine based on the control quantity signal from the control quantity calculating means 25. A control quantity integrating means 27 integrates the control quantity signal from the control quantity calculating means 25 with respect to time in response to an output signal from a gear change determining means 26 to thereby simulate a change in the driving force of the vehicle. The gear change determining means 26 determines, based on the output signals from the acceleration sensing means 21, the speed deviation calculating means 24 and the control quantity integrating means 25, whether the gear ratio of an automatic transmission 28 of the vehicle is to be changed, and controls the automatic transmission as a result of this determination.

Figure 9:
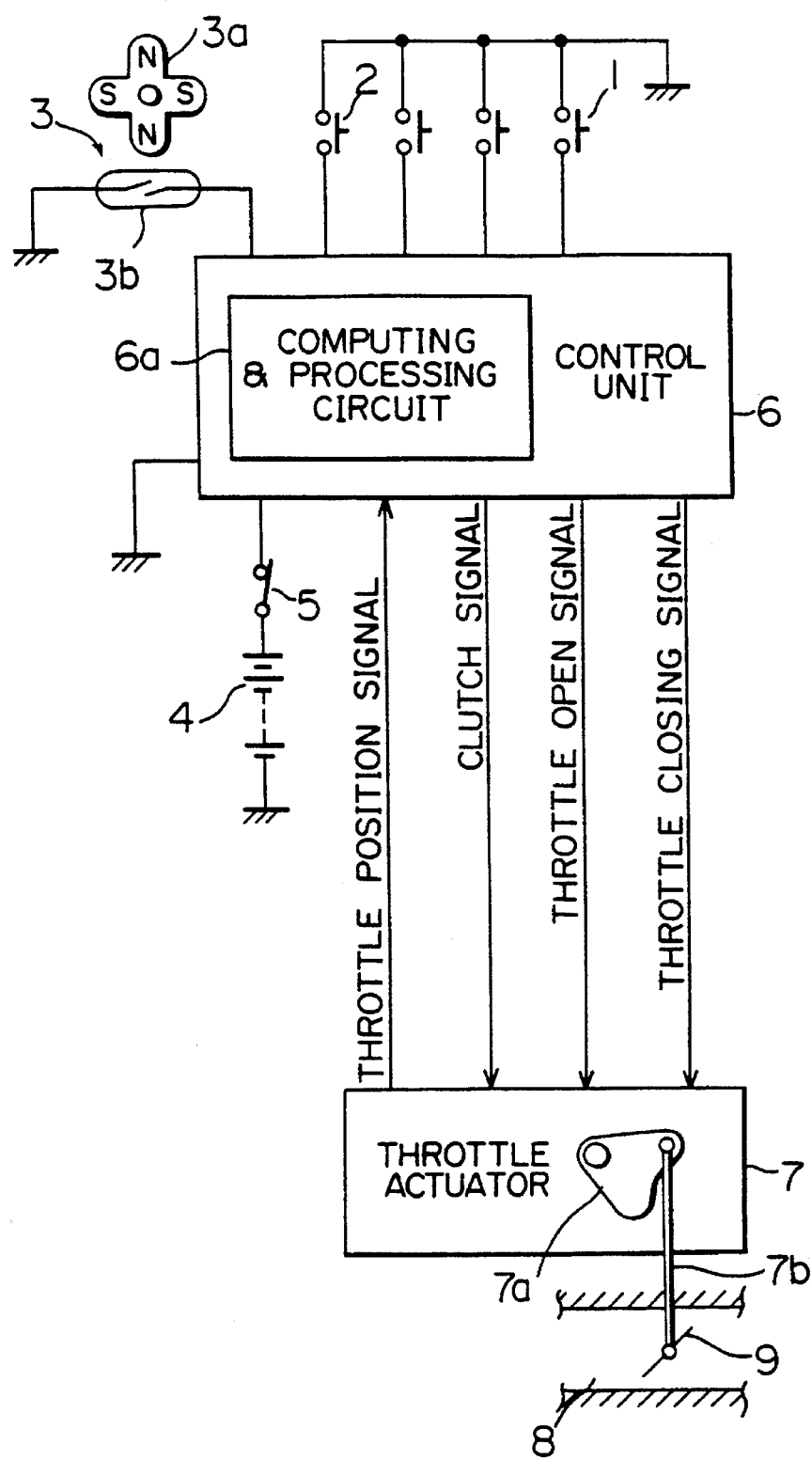
FIG. 9 is a schematic diagram showing the general construction of a conventional cruise control apparatus.

FIG. 2 shows a more concrete construction of the cruise control apparatus of the invention. Specifically, the operations of the acceleration sensing means 21, the target speed signal generating means 23, the speed deviation calculating means 24, the control quantity calculating means 25, the control quantity integrating means 27 and the gear change determining means 26 can be performed by a control unit 10 in the form of a microcomputer which comprises an input interface 10a, a memory 10b including a read only memory (ROM) for storing instruction and control programs, and a randos access memory (RAM) for temporarily storing data, a central processing unit (CPU) 10c which executes the programs stored in the ROM while reading out data stored in the RAM and writing data into the RAM, and an output interface 10d, as is well known in the art. The control unit 10 is powered by a battery 40 through a power or switch 50. The input interface 10a of the control unit 10 is connected to a cancellation switch 19 for cancelling cruise control, the speed sensor 20 and the set switch 22. The cancellation switch 19 and the set switch 22 are the same as the cancellation switch 2 and the set switch 1 of FIG. 9. The output interface 10d of the control unit 10 is connected to the throttle valve driving means 11 and to a gear changing solenoid 16 through a solenoid driving circuit 15. The gear changing solenoid 16 is driven to change the gear ratio of the automatic transmission 28 through the solenoid driving circuit 15 in accordance with an output from the output interface 10d of the control unit 10. The solenoid driving circuit 15 and the gear changing solenoid 16 are incorporated in the automatic transmission 28.

As shown in FIG. 2, the throttle valve driving means 11 comprises a diaphragm-type actuator 14 for controlling the opening of the throttle valve 29 disposed in an intake pipe 28 of the vehicle engine, and a pair of first and second electromagnetic valves 12, 13 for controlling the actuator 14 based on control signals y1, y2 from the control unit 10. Specifically, the actuator 14 includes a housing 14a having a hollow interior space thereof divided into a pair of first and second chambers 14b, 14c by a diaphragm member 14d on the opposite sides thereof. The first chamber 14b can be placed in fluid communication on one hand with an unillustrated vacuum source through a vacuum tube 12b under the action of the first electromagnetic valve 12 interposed therein, and on the other hand, it can be placed into fluid communication with the ambient atmosphere through an air pipe 13b under the action of the second electromagnetic valve 13 interposed therein. The first electromagnetic valve 12 is controlled to open or close by a first control signal y1 from the output interface 10d of the control unit 10, and the second electromagnetic valve 13 is controlled to open or close by a second control signal y2 from the output interface 10d of the control unit 10. The diaphragm member 14d is operatively connected through a link mechanism 14f with the throttle valve 29 in the intake pipe 28, so that the throttle valve 29 is caused to move in a valve-closing or opening direction in accordance with the movement of the diaphragm 14d through the link mechanism 14f. A biasing spring 14e is disposed in the housing 14a under compression between one side wall of the housing 14a and a central portion of the diaphragm 14d for biasing the diaphragm member 14d in a direction to close the throttle valve 29.

With the above arrangement of the throttle valve driving means 11, when the first control signal y1 is at a low level, the first electromagnetic valve 12 takes a closed position in which the first chamber 14b is out of communication with the vacuum source, whereas when the first control signal y1 is at a high level, the first electromagnetic valve 12 takes an open position in which the first chamber 14b is placed into communication with the vacuum source. On the other hand, when the second control signal y2 is at a low level, the second electromagnetic valve 13 takes an open position in which the first chamber 14b is placed into communication with the ambient atmosphere, whereas when the second control signal y2 is at a high level, the second electromagnetic valve 13 takes a closed position in which communication between the first chamber 14b and the ambient atmosphere is blocked. As a result, the throttle valve driving means 11 has three operational modes including an acceleration mode, a deceleration mode and a hold mode, as shown in Table I below.

TABLE I

| Operational Nodes | y1 | y2 | Throttle Valve |
| --- | --- | --- | --- |
| Acceleration | High | High | Open |
| Deceleration | Low | Low | Close |
| hold | Low | High | Constant |

As can be seen from Table I above, when the first and second control signals y1 and y2 are both at the high level, the throttle valve driving means 11 takes the acceleration mode in which the first and second electromagnetic valves 12, 13 are moved to the open and closed positions, respectively, so that the first chamber 14b in the housing 14a is placed in communication with the vacuum source alone. As a result, the diaphragm 14d is moved to the left in FIG. 2 against the biasing spring 14e under the action of vacuum in the first chamber 14b, whereby the throttle valve 29 is rotated through the link mechanism 14f in the opening direction, thus accelerating the vehicle. On the other hand, when the first and second control signals y1, y2 are both at the low level, the throttle valve driving means 11 takes the deceleration mode in which the first electromagnetic valve 12 is moved to the closed position and the second electromagnetic valve 13 is moved to the open position, so that the first chamber 14b is placed in communication with the atmosphere alone. Consequently, the diaphragm 14d is caused to move to the right in FIG. 2 under the action of the biasing spring 14e, whereby the throttle valve 29 is rotated in the closing direction through the link mechanism 14d, thus decelerating the vehicle. Further, when the control signals y1, y2 are at the low and high levels, respectively, the throttle valve driving means 11 takes the hold mode in which the first and second electromagnetic valves 12, 13 are both moved to their closed positions. Accordingly, the first chamber 14b is out of communication with both the atmosphere and the vacuum source, and hence the diaphragm member 14d is held at its constant position. Thus, the opening of the throttle valve 29 is also held constant.

Figure 3:
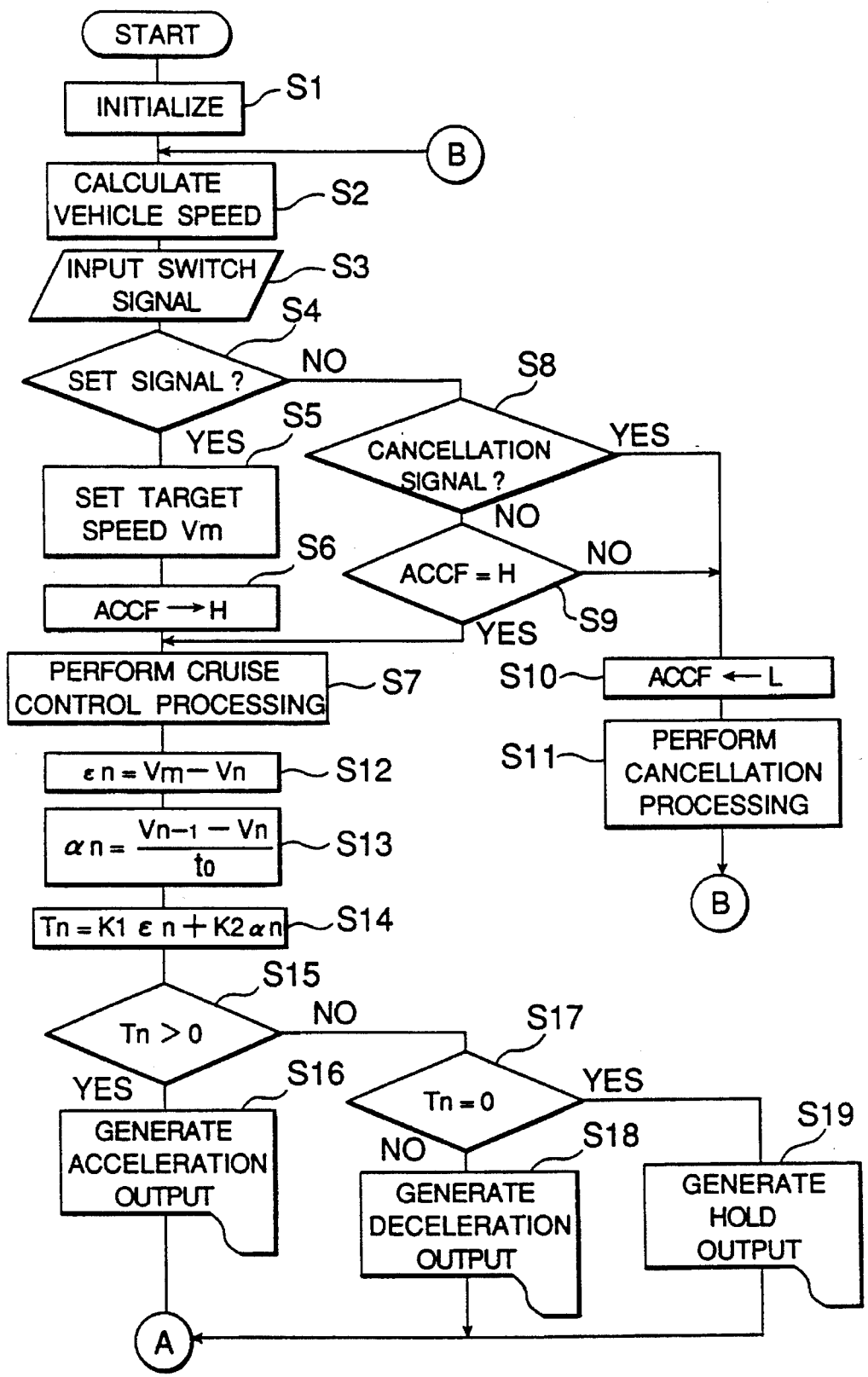
FIGS. 3 and 4 are flow charts which are to be combined with each other to form a single overall flow chart showing the operation of the cruise control apparatus of FIG. 1.
Figure 4:
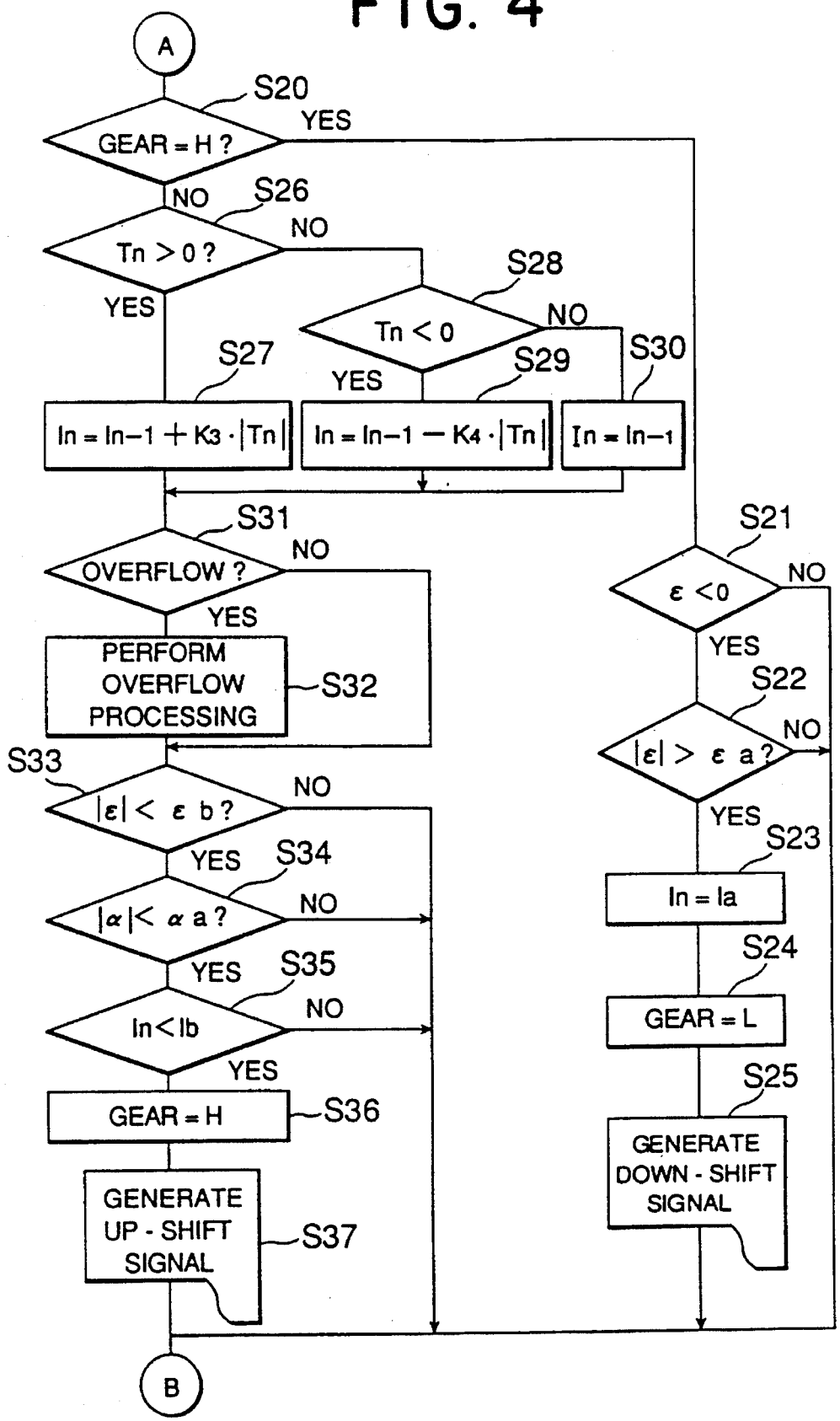
Figure 5:
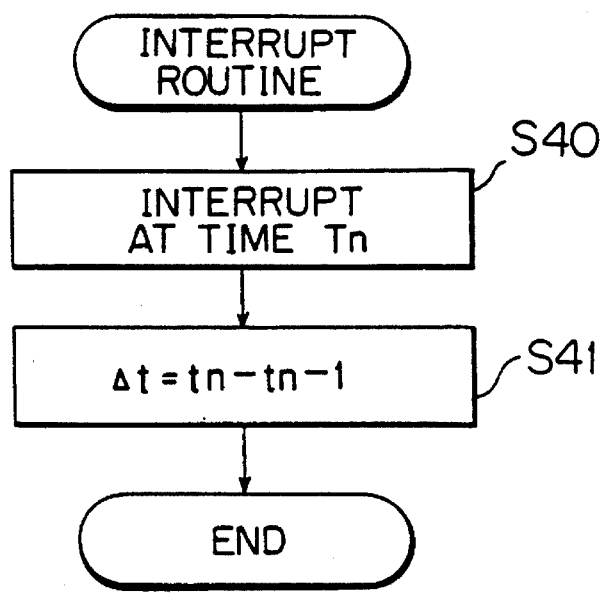
FIG. 5 is a flow chart of an interrupt routine.
Figure 6:
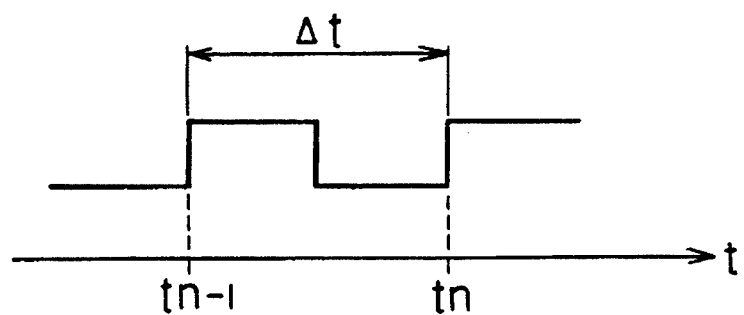
FIG. 6 is a waveform diagram explaining the operation of the cruise control apparatus of FIG. 1.

The operation of this embodiment will be described below while referring to FIGS. 3 through 8. First, when the main switch 50 is turned on by the driver, the control unit or microcomputer 10 is powered by the battery 40 and begins to execute a main routine as illustrated in FIGS. 3 and 4. On the other hand, during travel of the vehicle, the speed sensor 20 generates a speed signal comprising a series of successive pulses or a pulse train with a frequency proportional to the speed of the vehicle. When the speed signal is input to the input interface 10a of the microcomputer 10, the microcomputer 10 executes an interrupt routine as shown in FIG. 5. That is, upon input of each pulse in the speed signal, as shown in FIG. 6, the microcomputer 10 carries out the processing of the interrupt routine as follows. First in Step S40, the microcomputer 10 reads out from an unillustrated timer incorporated therein the point in time tn at which a current pulse in the speed signal rises. Then in Step S41, a difference or period Δt between the current time tn and the preceding time tn=1 (tn−tn−1) is calculated. Thereafter, the interrupt routine ends and a return is carried out to the main routine of FIGS. 3 and 4.

Turning now to the main routine of FIG. 3, first in Step S1, the microcomputer 10 is initialized, and then in Step S2, the current speed Vn of the vehicle at time tn is calculated from the most recent or latest pulse period Δt obtained in the above-mentioned current interrupt routine of FIG. 5 as follows:

$$Vn = g/\Delta t$$

where g is a speed conversion coefficient.

Subsequently, when the driver manipulates the set switch 22 to start cruise control, an input signal in the form of a cruise start signal is input from the set switch 22 to the input interface 10a of the microcomputer 10 in Step S3. In Step S4, it is determined whether the signal input to the microcomputer 10 is from the set switch 22. If so, then in Step S5, the current speed Vn of the vehicle calculated in the above manner is set as a target vehicle speed Vm.

Subsequently in Step S6, a flag for an automatic cruise control (ACC), in which the vehicle can travel at a constant speed (e.g., greater than about 40 km/h and less than about 100 km/h) desired and instructed by the driver in an automatic fashion without the need of the driver's accelerator pedal operation, is set up or made into a high level, and in Step S7, cruise control processing is carried out. On the other hand, if in Step S4 the input signal to the microcomputer 10 is not from the set switch 22, then in Step S8, it is determined whether the cancellation switch 19 is on or off. If the cancellation switch 19 is off, the control program goes to Step S9 wherein it is further determined whether the ACC flag is at the high level. If so, the control program goes to Step S7. If, however, the cancellation switch 19 is on in Step S8, or if the ACC flag is not set up (i.e., not at the high level) in Step S9, the program goes to Step S10 where the ACC flag is reset or made into a low level, and then in Step S11 the cancellation processing for cancelling the cruise control is performed. Thereafter, a return is carried out to Step S2.

In Step S12, a speed deviation εn between the target vehicle speed Vm and the current vehicle speed Vn actually measured is calculated, and in Step S13, a current acceleration αn of the vehicle is calculated from the current vehicle speed Vn and the preceding vehicle speed Vn−1 as follows:

$$\alpha n = (Vn - Vn-1)/to$$

where to is the period between the current pulse and the preceding pulse in the speed signal from the speed sensor 20. In Step S14, a current control quantity Tn for adjusting the opening of the throttle valve 9 is calculated as follows:

$$Tn = K1 \times \varepsilon n - K2 \times \alpha n \tag{1}$$

where K1 is a coefficient for obtaining the control quantity Tn from the speed deviation εn, and K2 is a coefficient for obtaining the control quantity Tn from the acceleration α.

In Step S15, it is determined whether the control quantity Tn is greater than Zero. If so (i.e., Tn>0), then in Step S16, the microcomputer 10 generates an acceleration output (i.e., the first and second control signals y1, y2 are both made into the high levels) whereby the throttle valve driving means 11 is operated to move the throttle valve 28 in the opening direction to thereby accelerate the vehicle. If not (i.e., Tn≦0), however, then in Step S17, it is determined whether the control quantity Tn is equal to zero. If Tn=0, the program goes to Step S18 where the microcomputer 10 generates a hold output (i.e., the first control signal y1 is made into the low level and the second control signal y2 is made into the high level) so that the throttle valve driving means 11 holds the opening of the throttle valve 29 at a constant level. If Tn<0, and the program goes to Step S18, the microcomputer 10 generates a deceleration output (i.e., the first and second control signals y1, y2 are both made into the low level) whereby the throttle valve driving means 11 is operated to move the throttle valve 29 in the closing direction, decelerating the vehicle.

Figure 7:
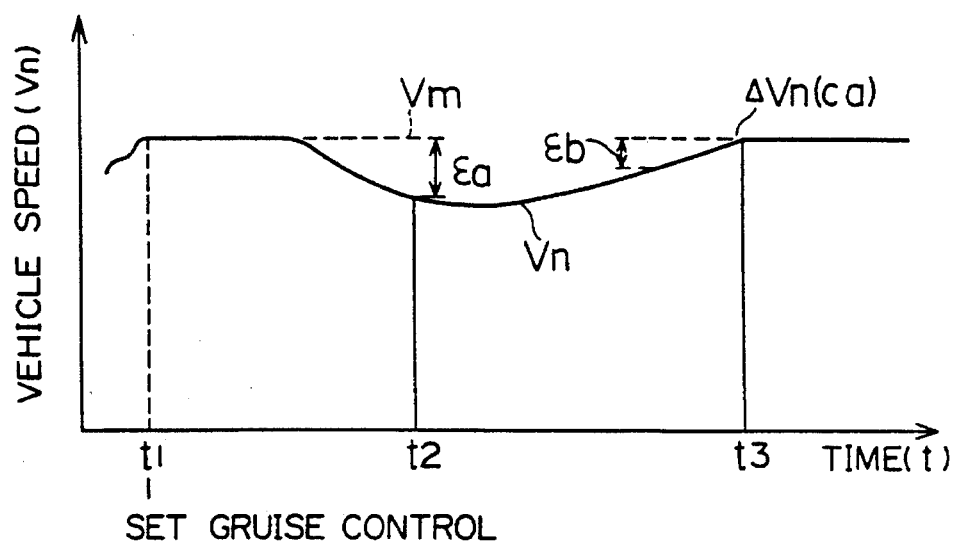
FIG. 7 is a graphical representation showing the varying vehicle speed over time with the cruise control apparatus of FIG. 1.
Figure 8:
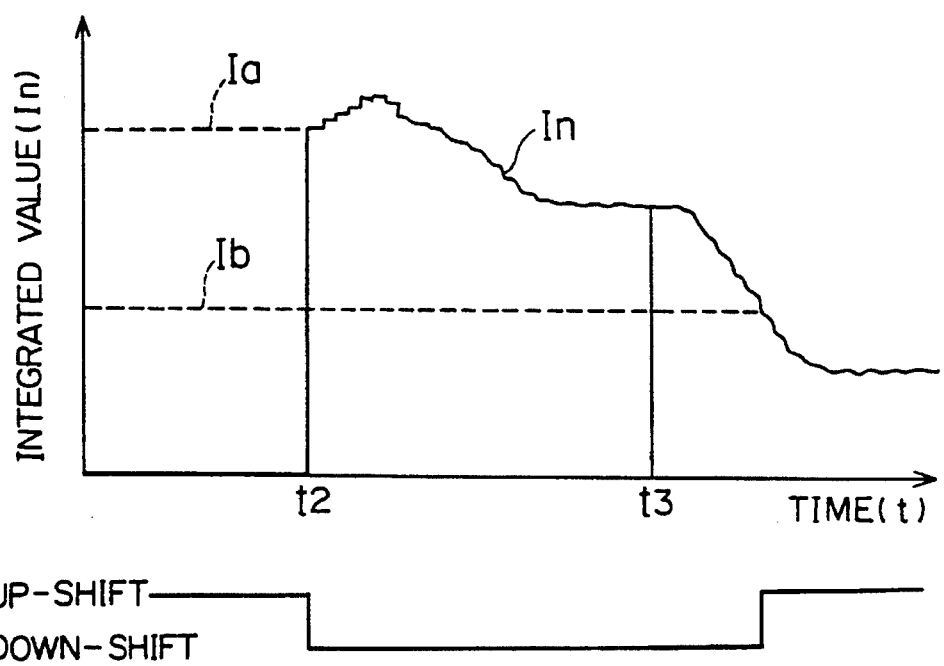
FIG. 8 is a graphical representation showing the varying integrated value of a control quantity over time in relation to gear shifting.

Subsequently in Step S20, it is determined whether the output signal supplied from the microcomputer 10 to the solenoid driving circuit 15 is at a high level (i.e., whether the transmission is in a high gear). If so, then in Step S21, it is further determined whether the speed deviation ε is less than zero. If ε<0, it is further determined in Step S22 whether the absolute value of the speed deviation ε is greater than a predetermined value εa (e.g., 8 km/h) at time t2, as shown in FIG. 7. If so (|ε|>εa), then in Step S23, an integration value In, which will be described later in detail, is initially set, at time t2, to an initial value Ia corresponding to a predetermined opening of the throttle valve 29 below which the transmission is down-shifted. Thereafter in Step S24, the output signal from the microcomputer 10 to the solenoid driving circuit 15 is set to a low level for down-shifting the transmission, so that in Step S25, the solenoid driving circuit 15 generates a down-shifting signal to the gear changing solenoid 16. If, however, the answer in Step S21 or S22 is negative, a return is performed to Step S2.

If in Step 20 it is determined that the transmission is in a low gear, then in Step S26, it is further determined, based on the control quantity Tn, whether the microcomputer 10 generates an acceleration output. If the answer to this question is positive (i.e., Tn>0), then in Step S27, the control quantity Tn, which controls the driving power of the vehicle or the output power of the engine, is integrated to provide a current integrated value In, which corresponds to the opening of the throttle valve 29, using the following formula:

$$In = In-1 + K3 \times |Tn| \tag{2}$$

where K3 is a constant, and In−1 is the preceding integrated value.

On the other hand, if the answer in Step S26 is negative (i.e., Tn≦0), then in Step S28 it is determined, based on the control quantity Tn, whether the output signal from the microcomputer 10 is a deceleration signal. If the answer to this question is positive (i.e., Tn<0), then in Step S29, the control quantity Tn is integrated to provide a current integrated value In using the following formula:

$$In = In-1 - K4 \times |Tn| \tag{3}$$

where K4 is a constant.

If it is determined in Step S28 that the output signal from the microcomputer 10 is not a deceleration signal but a hold signal (i.e., Tn=0), then in Step S30, a current integrated value In is given by the following equation:

$$In = In-1 \tag{4}$$

The integrated value In thus obtained is successively stored in the memory 10b in the microcomputer 10 which comprises, for example, an 8-bits memory.

In Step S31, it is further determined whether the memory 10b of the microcomputer 10 storing the integrated value In overflows during the integration (i.e., whether the integrated value In exceeds a predetermined value such as, for example, 255). If so, in Step S32, the integrated value In is clipped to an appropriate value. For example, the integrated value In is clipped to 255 when the memory overflows during acceleration, whereas it is clipped to zero when the memory underflows (i.e., overflows in the decreasing sense) during deceleration. If, however, there is no overflow or underflow in Step S31, the program jumps to Step S33 while skipping Step S32.

Subsequently, in Steps S33 and S34, it is determined whether smooth cruise control is performed during the time when the transmission has down-shifted down to increase the driving force of the vehicle. That is, in Step S33, it is determined whether the absolute value of the speed deviation ε is less than a predetermined value εb which is equal to or less than the predetermined value εa. If so (i.e., |α|<αa), then in Step S35, it is determined whether the absolute value of the acceleration α is less than a predetermined value αa. If the speed deviation ε and the acceleration α satisfy the above conditions (i.e., |ε|<εb and |α|<αa), the program goes to Step S35 where it is determined whether the integrated value In corresponding to the throttle opening is less than a predetermined value Ib which is less than the initial integration value Ia. If so (In<Ib), then in Step S36, the output signal from the microcomputer 10 to the solenoid driving circuit 15 is set to a high level for up-shifting the transmission. As a result, in Step S37, the solenoid driving circuit 15 generates an up-shift signal to the gear changing solenoid 16. If, however, the answer in Step S33, S34 or S35 is negative, a return is performed to Step S2.

As described above, in order to make the actual vehicle speed Vn equal to the target speed Vm, the control quantity Tn for controlling the driving force of the vehicle is integrated to simulate or estimate the opening of the throttle valve 29. When the absolute value of the speed deviation ε exceeds the predetermined value εa, the transmission is down-shifted, and the integrated value In of the control quantity Tn corresponding to the throttle opening at that time is set to an initial value Ia, whereas when the speed deviation ε and the acceleration α decrease below the predetermined values εb, αa, respectively, and when the integrated value In corresponding to the opening of the throttle valve 29 becomes less than the predetermined value Ib, the microcomputer 10 generates an up-shift signal for up-shifting the gear of the transmission. With this arrangement, gear change such as up-shifting or down-shifting of the transmission can be effected in accordance with the running resistance of the vehicle, thus enabling more precise and proper speed control during the vehicle is travelling under cruise control.

What is claimed is:

1. A cruise control apparatus for a vehicle, comprising:

a) a speed sensor for sensing a speed at which the vehicle is travelling, and for generating a corresponding speed signal;

b) acceleration sensing means for successively sensing an acceleration of the vehicle at predetermined intervals based on the output signal from said speed sensor;

c) a target speed setter for setting a target speed at which the vehicle is to travel;

d) target speed signal generating means for generating a target speed signal representative of the target speed;

e) speed deviation calculating means for calculating, based on the speed signal and the target speed signal, a deviation between the target speed and the actual vehicle speed and for generating a corresponding output signal;

f) control quantity calculating means for calculating a control quantity for controlling a driving force of the vehicle based on the output signals from said acceleration sensing means and said speed deviation calculating means;

g) throttle valve actuating means for driving a throttle valve in an engine of the vehicle based on the output signal from said control quantity calculating means;

h) control quantity integrating means for integrating the control quantity from the control quantity calculating means with respect to time;

i) gear ratio change determining means for determining whether a gear ratio is to be changed based on the output signal from said acceleration sensing means, said speed deviation calculating means and said control quantity integrating means;

wherein the integration performed by said control quantity integrating means is based on an output signal feedback from the gear ratio change determining means; and j) an automatic transmission operable to change its gear ratio in response to the output signal feedback from said gear ratio change determining means.

2. A cruise control apparatus according to claim 1, wherein said gear ratio change determining means generates a down-shift signal for down-shifting said automatic transmission when the speed deviation ε is negative and when the absolute value of the speed deviation ε is greater than a first predetermined value εa.

3. A cruise control apparatus according to claim 1, wherein said control quantity integrating means integrates the control quantity Tn to provide a current integrated value In using the following formulae in dependence upon the sign of the control quantity Tn:

when the control quantity Tn is positive, $$In=In-1+K3\times|Tn|$$

where In−I is a preceding integrated value, and K3 is a constant;

when the control quantity Tn is negative;

$$In=In-1-K4\times|Tn|$$

where In−1 is a preceding integrated value, and K4 is a constant;

when the control quantity Tn is equal to zero, $$In=In-1$$

where In−1 is a preceding integrated value.

4. A cruise control apparatus according to claim 1, wherein said gear ratio change determining means generates an up-shift signal for up-shifting said automatic transmission when the absolute value of the speed deviation ε is less than a second predetermined value εb and when the absolute value of the acceleration α is less than a predetermined value αa and when an integrated value In is less than a predetermined value Ib.

* * * * *